A. M. DELLINGER.
GRINDING DISK.
APPLICATION FILED SEPT. 4, 1915.

1,183,350. Patented May 16, 1916.

Inventor
Abraham M. Dellinger
By Wm W Babcock & Son
Attorneys

UNITED STATES PATENT OFFICE.

ABRAHAM M. DELLINGER, OF LANCASTER, PENNSYLVANIA.

GRINDING-DISK.

1,183,350. Specification of Letters Patent. Patented May 16, 1916.

Application filed September 4, 1915. Serial No. 49,098.

*To all whom it may concern:*

Be it known that I, ABRAHAM M. DELLINGER, a citizen of the United States, residing at Lancaster, in the county of Lancaster and State of Pennsylvania, have invented certain new and useful Improvements in Grinding-Disks, of which the following is a specification.

This invention relates to the dress of grinding disks especially adapted to feed mills and more especially to that type of disk wherein the material is reduced more by a shearing than a crushing action and wherein a free circulation of air between the disks is provided.

The main objects of this invention are to provide such a disk with a dress of this nature which will secure two distinct shearing cuts and which will retard the flow of ground material from between the disks so that it may be finely comminuted, without obstructing such flow to too great a degree.

A further object is to provide means for holding the cobs when ears of corn are to be ground in the mill, all of said objects being accomplished by the construction and arrangement hereinafter more particularly set forth and claimed.

Figure 1:
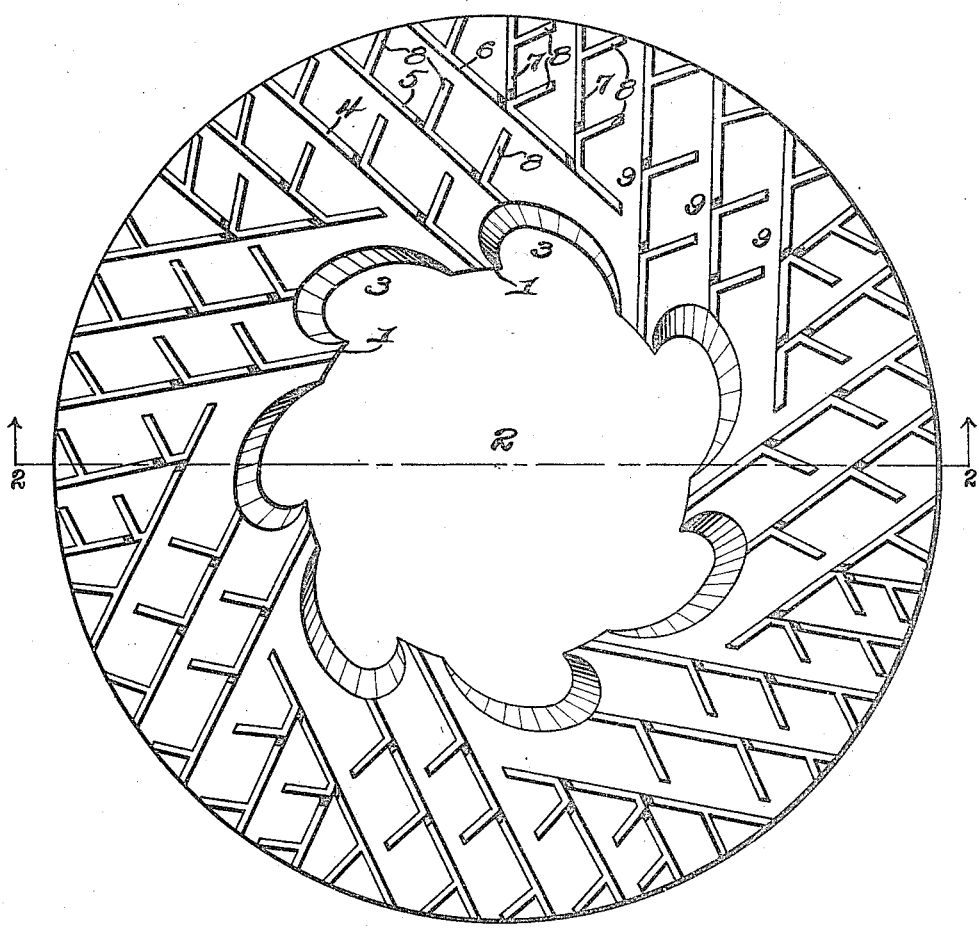
Figure 2:
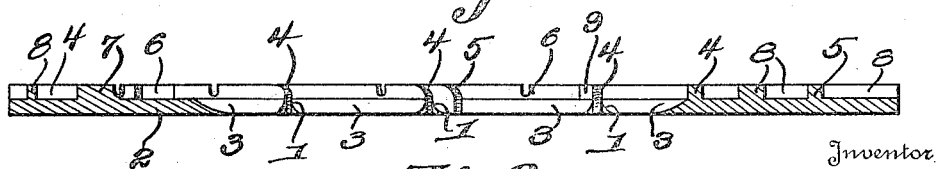

In the accompanying drawings: Figure 1 represents a front elevation of a disk embodying my invention; and Fig. 2 represents a cross-sectional view on the line 2—2 of Fig. 1.

In practice two opposing disks, such as shown in the drawing and hereinafter described, will be employed, one generally stationary and the other rotary. As the dress of these disks is identical and as they are opposed to each other, it will be evident that the stems, branches and ribs of the dress of either one of them will be inclined in an opposite direction from the inclination of the stems, branches and ribs of the dress of the other disk.

Referring now in detail to the drawing, the disk has a series of long sharp teeth or hooks 1 projecting into the eye or central open space 2. The material of the disk between these teeth 1 is cut out to form pockets 3, for better holding the cobs when ears of corn are to be ground. The edges of these pockets are beveled, as shown, to make them sharp to assist in gripping the cob.

The grinding face or dress of the disk consists of stems, branches and ribs, which are arranged in groups of three, there being as many groups as there are teeth 1, and the stems of each group being arranged parallel to each other. As shown, one stem 4 extends in a straight line from the periphery of the disk across its corresponding tooth 1, stopping evenly with the inner edge thereof, and in the direction of the latter, the arrangement and position of this stem 4 being such that, were it continued far enough it would cut a small segment from the circle described by the ends of the teeth or the eye of the disk.

The stem 5 next to stem 4 extends parallel thereto from the outer edge of the bevel of the edge of its respective pocket 3 to the periphery of the disk. The stem 6, the last of the group of three, extends parallel to the other two, from the periphery of the disk to a point adjacent to the stem 4 of the adjacent group of three and is provided with two branches 7 extending from the periphery of the disk to the stem 6 and parallel to each other and to the said stem 4 of said adjacent group.

Each stem 4 and each stem 5 is provided with three ribs 8 all on the same side of their respective stems and equally spaced from, and parallel to, each other. Each stem 6 is provided with one of these ribs 8, the ribs 8 of the stems 4, 5 and 6 being presented at the same wide acute angle with regard to their respective stems, so that any two of the ribs 8 on the stems 4, 5 and 6 of any one group will be parallel to each other.

Each of the branches 7 is provided with two ribs 8 presented at the same wide acute angle with relation to said branches as the ribs 8 of the adjacent stem 4 are with relation to said stem, so that any one of the ribs 8 on either of said branches 7 will be parallel to any one of the ribs 8 on said adjacent stem 4.

From the above it will be seen that the stems 4, 5 and 6 and branches 7 and the ribs 8 are presented at such angles to a line drawn perpendicular to the axis of the disk as to give two distinct shearing or cutting actions, the stems 4, 5, 6 and branches 7 giving one and the ribs 8 giving the other.

The ribs 8 in all cases stop short of the adjacent stems or branches, as do also the stems 6, a uniform distance to leave a passageway 9 for the egress of the material, after being thoroughly ground, from between the two disks.

The edges of the stems, branches and ribs are, in all cases, perpendicular to the face of the disk.

It will be obvious that the number of stems, teeth, branches and ribs may be varied at will to suit the size of the disk, the material to be worked on and individual taste and judgment.

To facilitate the circulation of air I cut away the material of each stem just above the ribs and branches, excepting the rib nearest the periphery and treat the branches in like manner. However, to prevent the material from being blown around through these cut out portions they should not be wider than what the ribs and branches will protect. In other words, they should fall within a line drawn from the tip of their respective ribs at right angles to its stem.

Having thus described my invention, what I claim as new and desire to secure by Letters Patent is:

1. A grinding disk provided with a series of stems raised on its face, some of said stems having branches on one side of them, said branches and stems having oblique ribs projecting from one side of them and each stem and branch being provided with an opening through it at the base of each rib, excepting the rib nearest the periphery, the remainder of all of said stems, branches and ribs being without openings.

2. A grinding disk having a dressing comprising a series of groups of stems provided with ribs extending therefrom on one side, the other side of each stem being smooth and the material of each stem being cut away to provide an opening just above the base of each rib on each stem excepting the rib nearest the periphery, each of said openings being protected by its respective rib which extends outward toward the periphery of the disk to a point beyond the outer edge of said opening so that said opening will fall within a line drawn through the tip of said rib at right angles to its stem to prevent the ground material from blowing around the disk through said openings.

In testimony whereof, I have signed my name to this specification in the presence of two subscribing witnesses.

ABRAHAM M. DELLINGER.

Witnesses:
   CHAS. E. LONG,
   J. H. BRIDGEMORE.

Copies of this patent may be obtained for five cents each, by addressing the "Commissioner of Patents, Washington, D. C."